United States Patent
Ezaki et al.

(10) Patent No.: US 8,768,347 B2
(45) Date of Patent: Jul. 1, 2014

(54) WIRELESS COMMUNICATION SYSTEM FOR ESTABLISHING COMMUNICATION BETWEEN A BASE STATION IN A MOVING VEHICLE AND A WIRELESS TERMINAL

(75) Inventors: Toshihiro Ezaki, Osaka (JP); Masaaki Higashida, Osaka (JP)

(73) Assignee: Panasonic Corporation, Osaka (JP)

( * ) Notice: Subject to any disclaimer, the term of this patent is extended or adjusted under 35 U.S.C. 154(b) by 588 days.

(21) Appl. No.: 12/681,016

(22) PCT Filed: Nov. 12, 2008

(86) PCT No.: PCT/JP2008/003273
§ 371 (c)(1),
(2), (4) Date: Mar. 31, 2010

(87) PCT Pub. No.: WO2009/063621
PCT Pub. Date: May 22, 2009

(65) Prior Publication Data
US 2010/0216457 A1 Aug. 26, 2010

(30) Foreign Application Priority Data
Nov. 15, 2007 (JP) .................... 2007-296516

(51) Int. Cl.
*H04W 4/00* (2009.01)
(52) U.S. Cl.
USPC .......................... 455/431; 455/427
(58) Field of Classification Search
CPC .................................................. H04W 84/005
USPC ...................... 455/427–431, 12.17
See application file for complete search history.

(56) References Cited

U.S. PATENT DOCUMENTS

| | | | | |
|---|---|---|---|---|
| 7,376,389 | B2 * | 5/2008 | Bassiri et al. | 455/7 |
| 7,680,454 | B2 * | 3/2010 | Mori et al. | 455/41.2 |
| 2003/0064752 | A1 | 4/2003 | Adachi et al. | |
| 2004/0098745 | A1 | 5/2004 | Marston et al. | |
| 2006/0221895 | A1 | 10/2006 | Mori et al. | |

FOREIGN PATENT DOCUMENTS

| | | |
|---|---|---|
| JP | 01-125129 A | 5/1989 |
| JP | 08-084107 A | 3/1996 |
| JP | 2003-179611 A | 6/2003 |
| JP | 2006-033564 A | 2/2006 |
| JP | 2006-506899 A | 2/2006 |
| JP | 2006-352328 A | 12/2006 |
| WO | 2004/047373 A2 | 6/2004 |
| WO | 2006/109584 A1 | 10/2006 |

OTHER PUBLICATIONS

International Search Report for PCT/JP2008/003273.

* cited by examiner

*Primary Examiner* — Huy C Ho
(74) *Attorney, Agent, or Firm* — Pearne & Gordon LLP (57) ABSTRACT

The present invention is a wireless communication system for establishing wireless communication between a wireless base station installed at the upper part of a communication area in a moving vehicle and a wireless terminal in the communication area, comprising a space surrounded by wall surfaces rising vertically in the communication area, wherein the space has an opening opened by specified width in a plane direction, and the wireless base station is installed in a region extended from the opening of the space by specified width outwardly of the wall surface.

4 Claims, 7 Drawing Sheets

WIRELESS COMMUNICATION SYSTEM FOR ESTABLISHING COMMUNICATION BETWEEN A BASE STATION IN A MOVING VEHICLE AND A WIRELESS TERMINAL

This application is a U.S. National Phase application of PCT international application PCT/JP2008/003273.

TECHNICAL FIELD

The present invention relates to a wireless communication system which is usable for aircrafts and trains, and particularly, it provides stable wireless communication over the entire region in an aircraft including a galley or the like.

BACKGROUND ART

Recently, wireless communication systems such as IEEE802, 11a/b/g are widely employed. These are communication systems having an equivalent wireless function substituted for Ethernet (registered trademark) that is called wireless LAN (Local Area Network) system and used for cable LAN system.

A wireless LAN system was initially used for a pocket or portable personal computer and a portable wireless terminal device. After that, the range of use expanded to various fields, and for example, in order to eliminate the complication of wiring cables, a wireless LAN system has been proposed for terminal devices whose using place is fixed.

As an example of its application, conventionally proposed is a technology of using a wireless LAN system for video and audio contents distribution service in aircrafts (for example, refer to Patent document 1).

In this example, a wireless LAN system is installed in an aircraft, and contents data is delivered to a wireless terminal device mounted in each passenger seat, thereby realizing information distribution service for which the wireless LAN system is used. Such a distribution system is configured in that contents data offered to users is accumulated in a server of the system, and a plurality of wireless access points (hereinafter called access points) serving as wireless base station equipment connected to the server are installed in the aircraft. Also, a wireless terminal device is installed in each seat, and the position of each access point is set so that one access point covers a plurality of wireless terminal devices. As an access point setting method, the interior space of the aircraft is divided into a plurality of small areas, and the access points are respectively allocated to the service areas in the aircraft so that one access point corresponds to one small area. In this example, each small area is partitioned by using a working area as a boundary such as a kitchen that is called a galley where cabin crews offer services. Many of the galley walls are made by using a material such as metal or carbon composite material that is an obstacle to radio wave propagation, forming an electromagnetic shield structure. Also, a toilet or the like having walls made by using the above-mentioned material is often disposed in the vicinity of the galley or as a part of the galley. Therefore, structures having an electromagnetic shield structure such as a galley and toilet are generally called galley in the following description.

As a countermeasure for interference between wireless terminal devices, a directional antenna is disposed at each access point so that radio waves are radiated without giving interference or disturbance to other small areas as much as possible, and it is set for wireless communication with each wireless terminal device within its area by using a predetermined channel. It is configured in that communication is established between one access point and each wireless terminal device within its small area through time division of frequency band of the channel, and thereby, it is possible to individually provide information distribution service to a plurality of wireless terminal devices by using one channel.

As for wireless communication, there are conventionally disclosed methods such as a method of making radio waves reflected from wall surfaces between wireless base station and wireless terminal and a method of enhancing communication efficiency and antenna efficiency by dividing electromagnetic wave components such as vertically polarized wave and horizontally polarized wave to be used (for example, refer to Patent documents 2 to 4).

However, in the case of communication between a cabin crew and a passenger or between cabin crews in an aircraft, the cabin crew is moving in the aircraft or working in the galley in many cases. In case the cabin crew is moving, it is possible for the crew to make communication by using a portable wireless terminal device because of an access point that covers a wide area. However, when the crew is in a galley or the like, it is difficult to establish stable wireless communication because the outer surfaces of the galley reflect the radio waves. Accordingly, the conventional method is such that a cabin crew uses a plurality of cable communication terminals installed at fixed portions to make communication with other cabin crew or passenger. As a result, there arises a problem that it is necessary for the cabin crew each time to move for communication to a place where a cable communication terminal is installed, and it is rather troublesome and also results in being late in contacting in case of emergency.

PRIOR ART DOCUMENTS

Patent document 1 Unexamined Japanese Patent Publication 2006-33564.

Patent document 2 Unexamined Japanese Patent Publication H8-84107.

Patent document 3 Unexamined Japanese Patent Publication 2006-352328.

Patent document 4 Unexamined Japanese Patent Publication H1-125129.

SUMMARY OF THE INVENTION

The wireless communication system of the present invention is a wireless communication system for establishing wireless communication between a wireless base station installed at an upper part of the communication area in a moving vehicle and a wireless terminal in the communication area, comprising a space surrounded by wall surfaces vertically rising in the communication area, wherein the space includes an opening opened by specified width in the plane direction, and the wireless base station is installed in a region extended from the opening of the space by specified width outwardly of the wall surface.

In such a configuration, it is possible for a wireless terminal to make communication via the wireless base station installed in the region extended from the opening of the space surrounded by wall surfaces by specified width outwardly of the wall surface. Accordingly, it is possible to provide and use stable wireless communication service in a moving vehicle irrespective of places including inside a galley where the wireless terminal is used.

Also, the wireless communication system of the present invention is a wireless communication system for establishing wireless communication between a wireless base station installed at an upper part of the communication area in a moving vehicle and a wireless terminal in the communication area, comprising a space surrounded by wall surfaces vertically rising in the communication area, wherein the space includes an opening opened by a specified width in the plane direction, and the wireless base station is installed in a vertically extended region of the space.

In such a configuration, it is possible for a wireless terminal to make communication with a wireless base station internally installed in the space surrounded by walls with use of direct waves having stable communication quality, and to establish communication with the outside by using the wireless base station. Accordingly it is possible to realize reliable high-quality communication with the outside even in a space surrounded by walls in a moving vehicle.

DESCRIPTION OF REFERENCE MARKS

1 Wireless communication system
2. 3 Cabin crew
2D, 3D, 50 Mobile wireless terminal device
20, 30 Access point device
40 Wireless terminal device
41M, 42M, 43M, 44M, 45M, 46M, 47M Seat
100, 300 Information service area
101a, 101b Aisle
102 Floor
103 Ceiling
200 Galley
201a, 201b, 201c, 201d Opening
A01, A02, A03, A1, A2, A3 Service area (small area)
AP0, AP01, AP02, AP03, AP04, AP05, AP1, AP2, AP3 Access point
C1, C2 Communication line
S Distance

PREFERRED EMBODIMENTS FOR CARRYING OUT INVENTION

The preferred embodiments of the present invention will be described in the following by using an example applied to a cabin area in an aircraft that is one of transportations externally and electromagnetically shielded.

Preferred Embodiment 1

Figure 1:
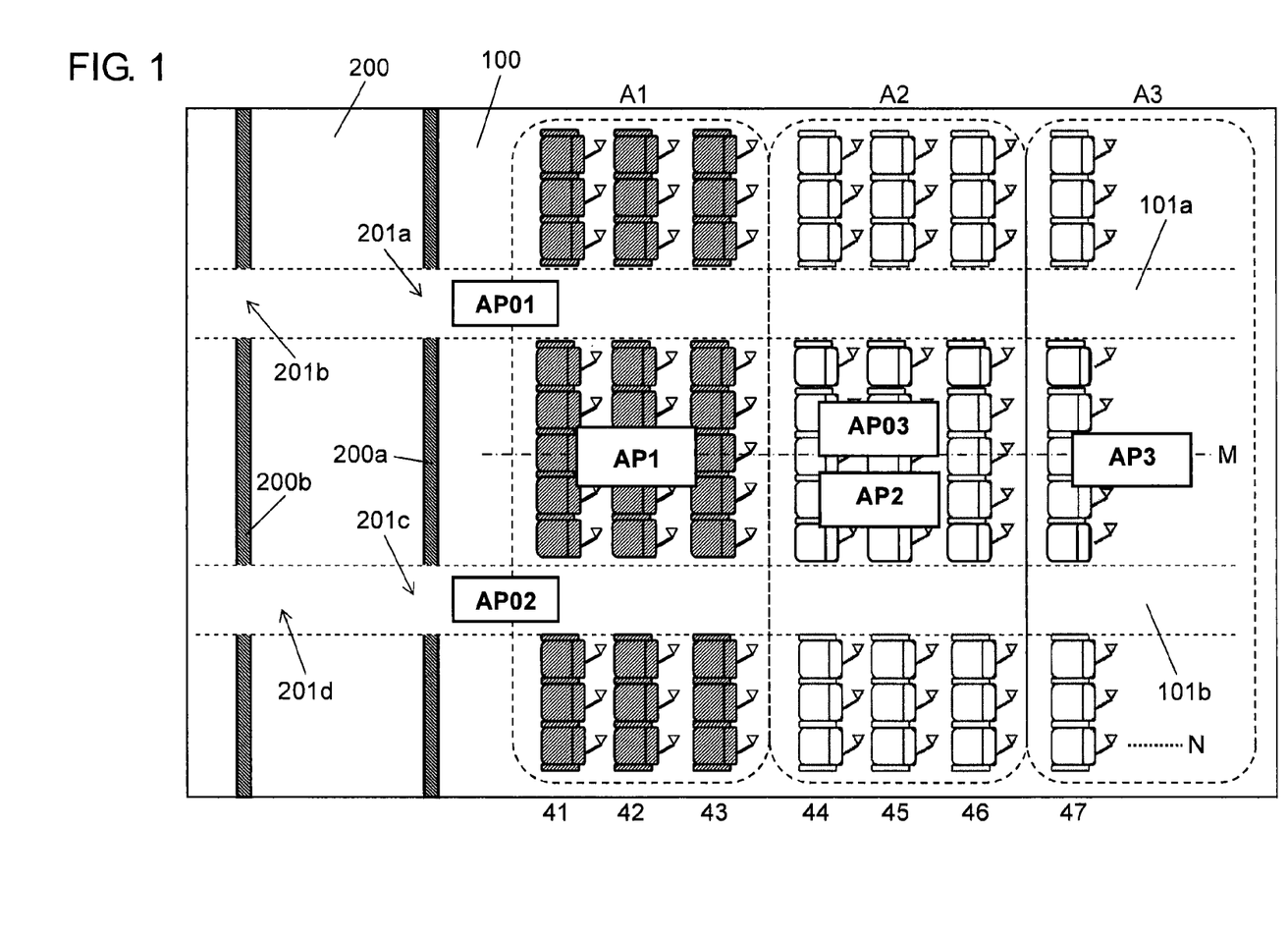
FIG. 1 is a plan view showing the main configuration of a wireless communication system in the preferred embodiment 1 of the present invention.
Figure 2:
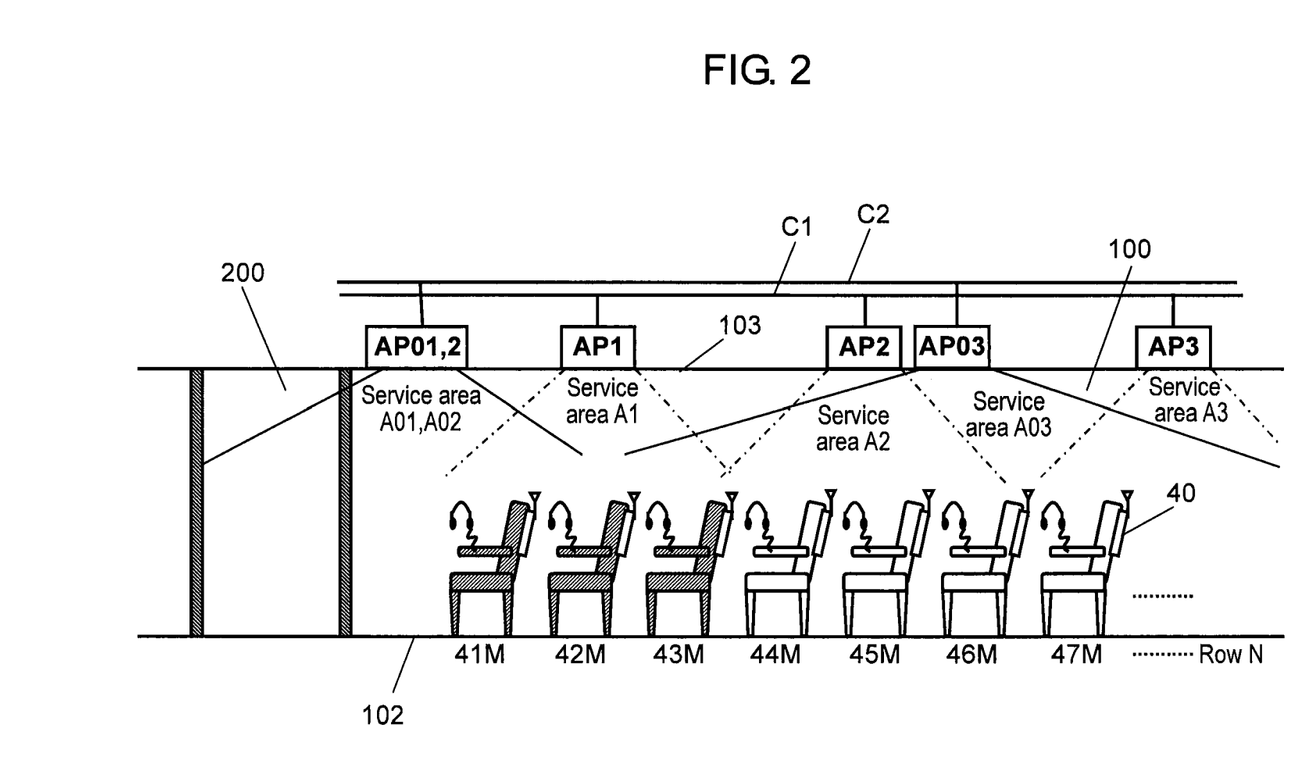
FIG. 2 is a side view showing the main configuration of a wireless communication system in the preferred embodiment 1 of the present invention.

FIG. 1 and FIG. 2 are respectively a plan view and side view showing the main configuration of a wireless communication system in the preferred embodiment 1 of the present invention.

As shown in FIG. 1 and FIG. 2, information service area 100 disposed in the cabin that is a communication area of the aircraft is provided with a plurality of seats 41M, 42M, 43M, . . . arranged on the floor 102 by N rows in the lengthwise direction and M lines in the widthwise direction. Access points AP1, AP2, AP3, . . . (hereinafter, access point is generally abbreviated to AP) are connected to a contents distribution server (not shown) via communication line C1 such as Ethernet (registered trademark), and it is possible to offer contents service to the passengers, receiving video and audio contents from the contents distribution server. Each access point, in the lengthwise direction, for example, covers three rows of seats as a service area, and there are provided three service areas A1, A2, A3 for seat 41M to seat M47. In FIG. 2, all access points are arranged above the ceiling 103 of the aircraft, but it is allowable to arrange the access points under the ceiling 103. Each seat is provided with wireless terminal device 40 disposed on the rear of the front seat, and wireless terminal device 40 is equipped with an antenna having a function of receiving video information from the access point and displaying the picture.

The access points AP1, AP2, AP3 serve to offer contents service to the passengers, but in the aircraft, independent of these access points for contents service, there are provided access points AP01, AP02, AP03, . . . for business communication to be used by cabin crews who communicate with each other during movement in a galley or the like of the aircraft. These access points for business communication are connected to a server for cabin crew (not shown) via communication line C2 such as Ethernet (registered trademark). Different frequency channels are allocated to these two types of access points so that the radio waves will not interfere with each other.

Figure 3:
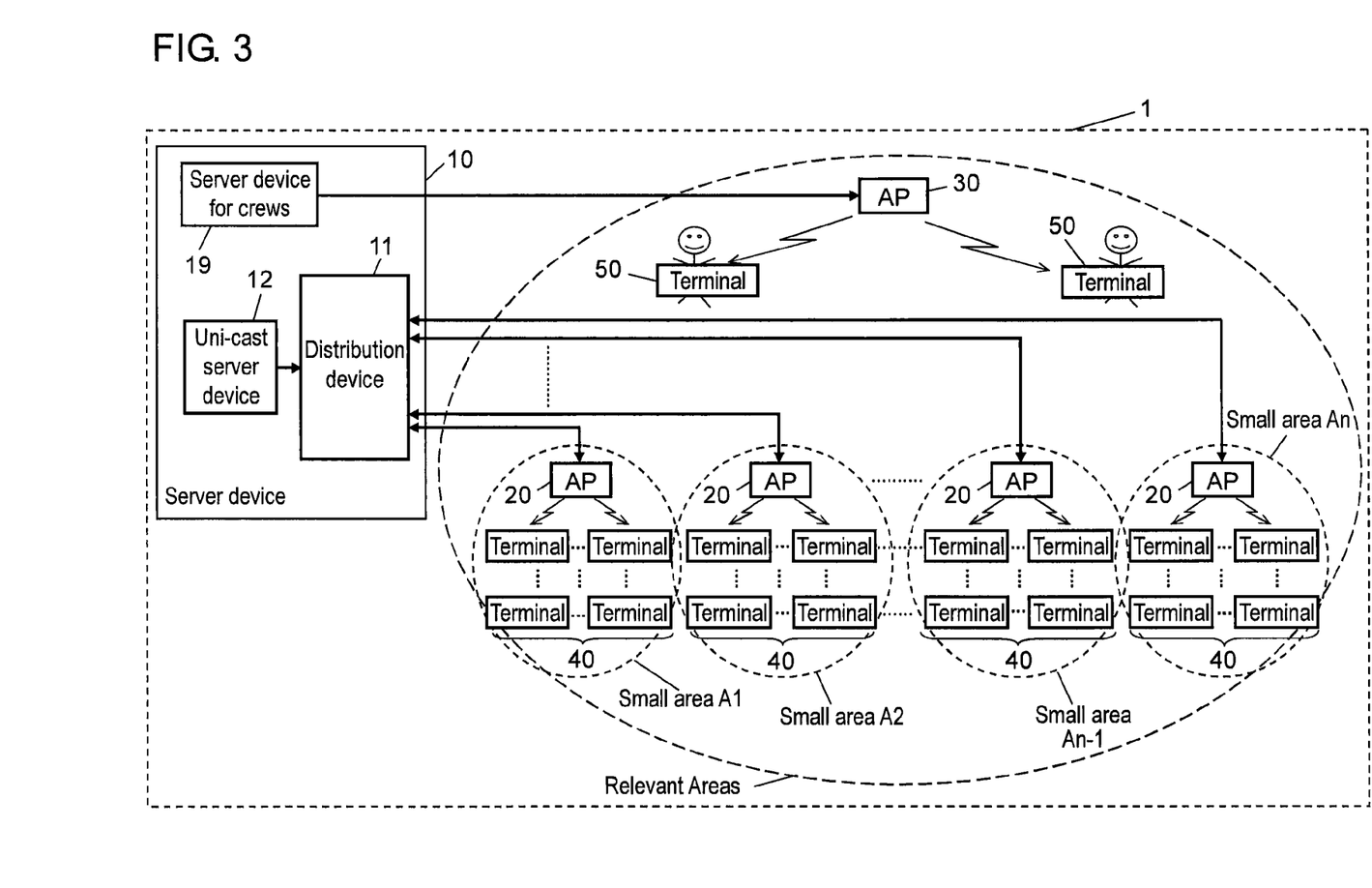
FIG. 3 is a block diagram showing the main configuration of a wireless communication system in the preferred embodiment 1 of the present invention.

The overall configuration of wireless communication system 1 will be described in the following with reference to FIG. 3. FIG. 3 is a block diagram showing the overall main configuration of wireless communication system 1 in the present preferred embodiment. As shown in FIG. 3, wireless communication system 1 comprises server device 10 for controlling the contents distribution to passengers and the communication between cabin crews, a plurality of access point devices 20 respectively connected to server device 10, one access point device 30 connected to server device 10, and wireless terminal device 40 that is a fixed wireless terminal device for passenger making wireless communication with access point device 20, and mobile wireless terminal device 50 for cabin crews making wireless communication with access point device 30. The access points AP1, AP2, AP3 correspond to access point device 20, and access points AP01, AP02, AP03 correspond to access point device 30. Here, to simplify the description, it is supposed that one access point device 30 for cabin crews is used and the entire region in the aircraft is covered by the access point device 30 in the following description.

Also, the information provided area to be provided with information of wireless communication system 1 is divided into a plurality of small areas, and one access point device 20 is arranged in each small area, and communication is established between access point device 20 and a plurality of wireless terminal devices 40 included in each small area. FIG. 3 shows an example of a case such that the relevant area is divided into n pieces of small areas ranging from small area A1 to small area An. Further, in addition to access point device 20 for each small area, there is provided access point device 30 capable of communicating with mobile wireless terminal device 50 freely moving in the information provided area.

In such a configuration, wireless communication system 1 distributes contents such as movie or music programs requested from the passengers to wireless terminal device 40 disposed in front of the seat of each passenger from server device 10 via access point device 20, wherein it is also possible to establish wireless communication such as business communication between cabin crews via access point device 30 connected to server device 10. For example, cabin crews move in the aircraft for giving food service to the passengers.

In that case, each cabin crew has mobile wireless terminal device 50 to be connected to access point device 30, and for example, a chief cabin crew is able to call a moving cabin crew from the terminal of crew server device 19 or exchange information data. Then, as described above, since communication using access point device 30 is business communication for cabin crews, a process of distributing individual contents data through time division is not needed, and it is possible to immediately communicate with mobile wireless terminal device 50 of each cabin crew.

The function of main component elements of wireless communication system 1 will be described in the following. Server device 10 comprises uni-cast server device 12 for distributing individual contents such as programs desired by the passengers, distribution device 11 which controls the connection between uni-cast server device 12 and each access point device 20, and crew server device 19 for establishing business communication between cabin crews.

Uni-cast server device 12 is a server for executing so-called uni-cast for distributing contents to a specific user, and for example, it has contents data, video data and audio data, such as movie programs and music programs. With use of uni-cast server device 12, it is possible to distribute individual contents desired by passengers to each wireless terminal device 40.

Distribution device 11 controls for making communication connection between access point device 20 in a small area including wireless terminal device 40 and uni-cast server device 12 in order to distribute the contents desired by passenger to wireless terminal device 40 corresponding to the passenger. In this way, the contents data of each program stored in uni-cast server device 12 can be distributed to each access point device 20.

Crew server device 19 is a server for managing the communication between cabin crews, which is connected to access point device 30 by means of cables or the like. Each cabin crew is able to establish communication via crew server device 19.

Access point device 20 is a wireless base station device provided for establishing wireless connection with wireless terminal device 40, which is connected to distribution device 11 of server device 10 by means of cables or the like.

Access point device 30 is a wireless base station device provided for establishing wireless connection with mobile wireless terminal device 50 moving in the aircraft, which is connected to crew server device 19 of server device 10 by means of cables or the like. Also, access point device 30 is connected to mobile wireless terminal device 50, forming a wireless LAN system, in the relevant area around access point device 30. With use of access point device 30, it is possible to establish communication with mobile wireless terminal device 50 moving in the entire region of the relevant area, completely covering the relevant area. Channels that do not interfere with radio waves from access point device 20 are selected for access point device 30.

The communication method and configuration related therewith will be described in the following with respect to such a case that a cabin crew in a galley communicates with a cabin crew moving outside the galley as characterized in the present invention.

Figure 4:
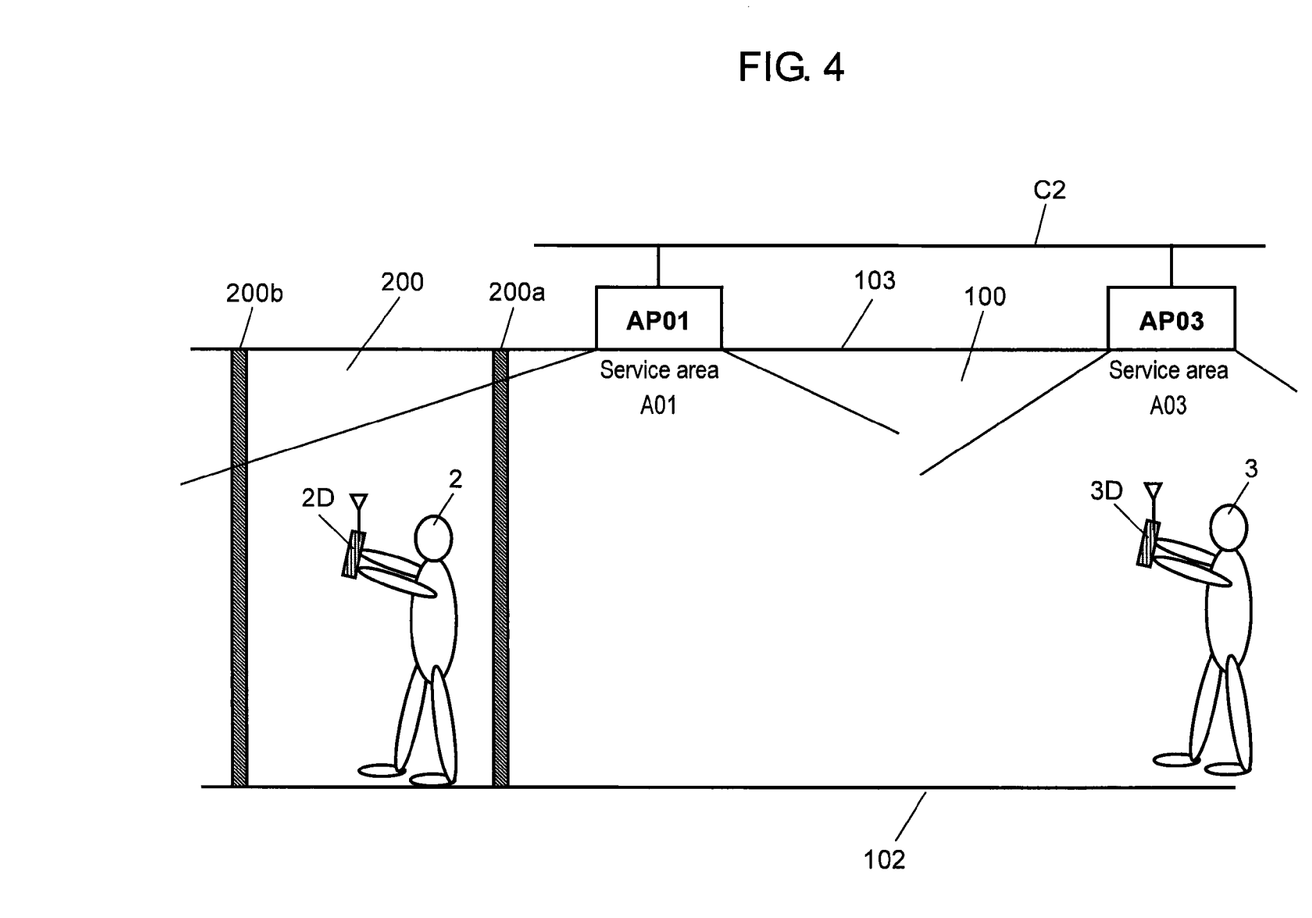
FIG. 4 is a side view for describing the function of a wireless communication system in the preferred embodiment 1 of the present invention.

FIG. 4 is a side view for describing the function of wireless communication system 1 in the preferred embodiment 1 of the present invention. Shown here is a case such that cabin crew 2 in galley 200 using mobile wireless terminal device 2D, for example, makes business communication via mobile wireless terminal device 3D to other cabin crew 3 moving outside the galley 200. As shown in FIG. 1 and FIG. 2, galley 200 is a space provided in the cabin that is a communication area of the aircraft, which is surrounded by wall surfaces 200a, 200b of radio wave shielding material and vertically raised from a surface (horizontal surface) of floor 102 of the aircraft. Also, galley 200 has openings 201a, 201b, 201c, 201d as entrances opened from floor 102 to ceiling 103 in a predetermined width in the plane direction, which is used as a working region such as a kitchen used by cabin crews to provide services. In the present preferred embodiment, the width of openings of galley 200 is equal to the width of aisles 101a, 101b.

In wireless communication system 1 in the present preferred embodiment, when business communication is established between cabin crew 2 in galley 200 and other cabin crew 3 moving outside the galley 200 or working in other galley 200, relay access points AP01, AP02, AP03 disposed in information service area 100 in the cabin shown in FIG. 1 and FIG. 2 are used. Information emitted from mobile wireless terminal device 2D of cabin crew 2 in galley 200 is once received by access point AP01. The information received by access point AP01 is transmitted by communication line C2 to server device 10 (not shown) via a distribution device. Server device 10 transmits all the received information to access points AP01, AP02, AP03 for business communication. Mobile wireless terminal device 3D for communication receives the information emitted from mobile wireless terminal device 2D of cabin crew 2 via access point AP03. When information is emitted from mobile wireless terminal device 3D of cabin crew 3 to mobile wireless terminal device 2D of cabin crew 2, the information is transmitted in the reverse order.

Figure 5:
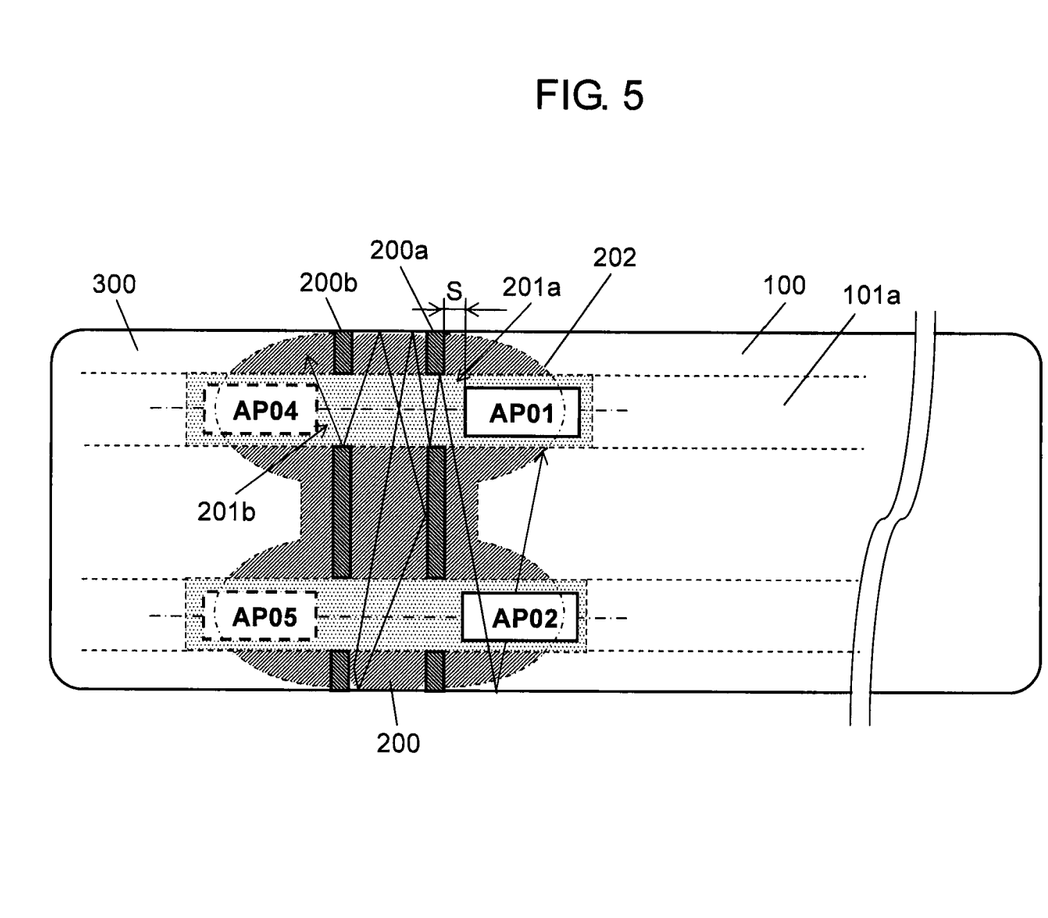
FIG. 5 is a plan view sowing the installation places of access points for business communication of a wireless communication system in the preferred embodiment 1 of the present invention.

The arrangement positions of relay access points in the present preferred embodiment are described in the following with reference to FIG. 1 and FIG. 5. FIG. 5 is a plan view showing the arrangement positions of relay access points.

Firstly, as shown in FIG. 1, access point AP01 is arranged at an upper part of the cabin on the center line of aisle 101a in information service area 100 formed with opening 201a and opening 201b of galley 200. That is, access point AP01 is arranged in a region extended outwardly of the wall surface by width of opening 201a and opening 201b.

Similarly, access point AP02 is arranged on the center line of aisle 101*b* in information service area 100 formed with opening 201*c* and opening 201*d* of galley 200. Here, as shown in FIG. 1 and FIG. 5, galley 200 is a space surrounded by vertical wall surfaces 200*a*, 200*b* and provided with four openings 201*a*, 201*b*, 201*c*, 201*d*.

FIG. 5 is a schematic diagram showing a state of radio wave emitted from inside the galley 200, reflected from the wall surfaces in galley 200, and propagated outside the galley 200 from openings 201*a*, 201*b*. Area 202 surrounded by chain line is an area that allows reliable communication. Thus, since radio wave is propagated outside through openings 201*a*, 201*b*, access point AP01 is most effective to be arranged on the center line of aisle 101*a*, that is, on the extension line of opening 201*a*, and in the vicinity of opening 201*a*. Same holds true for access point AP02.

As to access point AP01, the optimum value of distance S from opening 201*a* of galley 200 on aisle 101*a* is determined on the basis of design requirements in mutual relationship between galley 200 and access point AP01 such as the structure, size and shape of galley 200, the size and shape of opening 201*a*, the directivity and sensitivity of access point AP01. Also, Same holds true for access point AP02. As described in the present preferred embodiment, when a plurality of access points for business communication are arranged in a space surrounded by a galley or the like, an access point disposed on the extension line of opening of galley 200, in the vicinity of the opening, is able to effectively receive the radio wave coming out of the opening.

Preferred Embodiment 2

Figure 6:
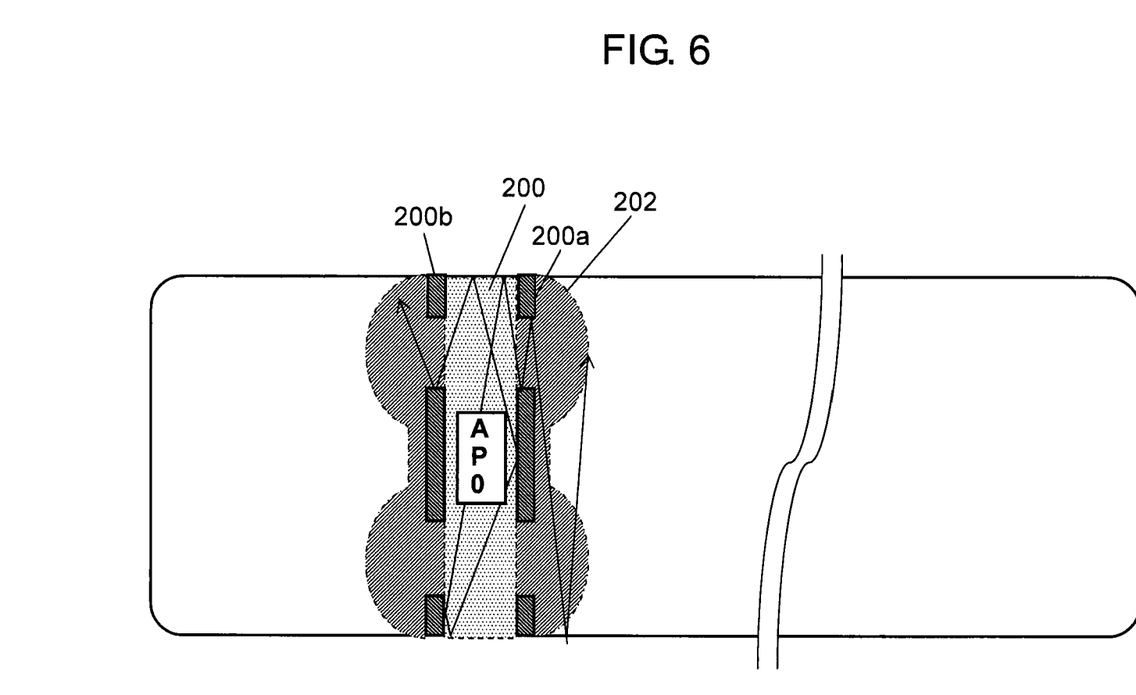
FIG. 6 is a plan view sowing the installation places of access points for business communication of a wireless communication system in the preferred embodiment 2 of the present invention.

The preferred embodiment 2 in which another distribution method is employed for access points for business communication will be described in the following. The configuration and communication operation of the wireless communication system except the installing position of access point for business communication are same as in the preferred embodiment 1, and the detailed description is omitted. FIG. 6 shows another distribution method for relay access points in the preferred embodiment 2 of the present invention. In this case, access point AP0 for business communication is arranged in galley 200. The installing position is allowable to be under the ceiling 103 or above the ceiling 103 in galley 200 the same as in the preferred embodiment 1. That is, access point AP0 is installed within a region of space vertically extended from the surface of floor 102 in galley 200. Also in this case, area 202 surrounded by chain line is an area that allows reliable communication. Due to this arrangement, it is possible to establish communication using direct wave component that is said to be best for obtaining stable wireless communication in galley 200, enabling the improvement of communication quality. Also, as for the installing position of access point AP0 in galley 200, depending upon the conditions such as internal structure or built-in equipment of galley 200, it is preferable to install in a position where the entire region in galley 200 is covered and the radio wave is efficiently propagated outside the galley 200 as well.

Preferred Embodiment 3

The wireless communication system in the preferred embodiment 3 of the present invention will be described in the following. The wireless communication system in the present preferred embodiment makes it possible to establish efficient communication by using vertically polarized wave as radio wave for communication in addition to the selection of proper installing position of access point described in the preferred embodiment 1 and preferred embodiment 2. Here, vertically polarized wave is defined as radio wave whose polarized wave face is vertical to the floor surface of the aircraft. In case the number of access points in information service area 100 is strictly limited, it is necessary to cover a wider area with access points AP01, AP02, AP04, AP05, and as a matter of course, these access points have to be arranged in positions far away from the opening of galley 200. For example, in the case of access point AP01, if the installing position is too far from opening 201*a* of galley 200, the radio wave will not sufficiently get into galley 200, causing the communication in galley 200 to become unstable. Also, when intended to cover the entire region in the aircraft with less number of access points, it is necessary to increase the output power of access point, and in case the access point is installed in galley 200, there is a possibility that the communication becomes unstable because of excessive reflection.

Figure 7A:
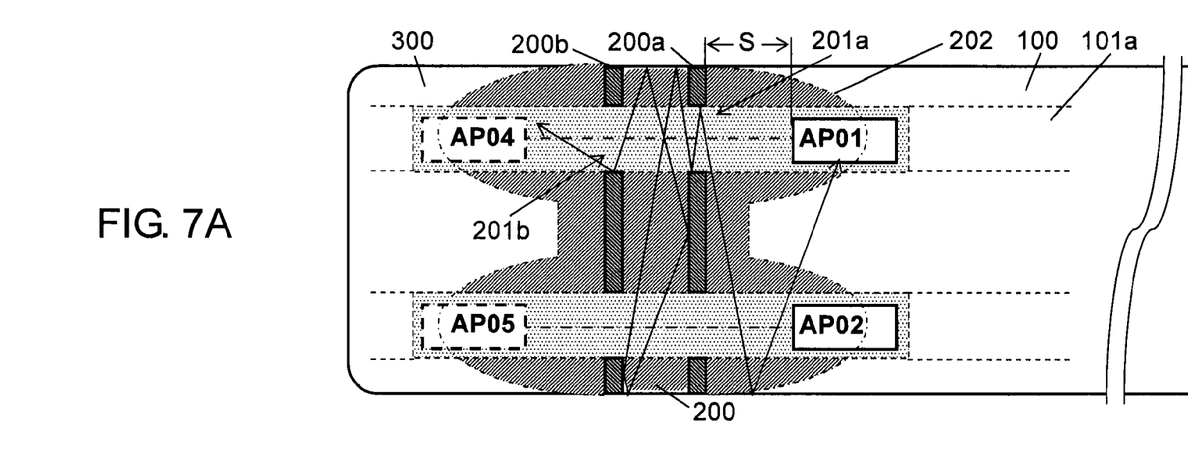
FIG. 7A is an arrangement drawing in which access points for business communication of a wireless communication system in the preferred embodiment 3 of the present invention are arranged on the extension line of opening.

Generally, radio wave using vertically polarized wave is well reflected from a wall surface parallel to the polarized wave face of radio wave, and therefore, the radio wave may reach every portion within the space surrounded by vertical wall surfaces. That is, the signal emitted as vertically polarized wave from mobile wireless terminal device 2D of cabin crew 2 is efficiently reflected from two wall surfaces 200*a* and 200*b* which are parallel to each other forming galley 200 so that the radio wave is easier to move around in the galley. Also, as a result, it is possible for mobile wireless terminal device 2D in galley 200, access point AP01 and access point AP02 to reliably exchange information with use of vertically polarized wave. FIG. 7A, B is a plan view showing the installation place of access point for business communication of the wireless communication system in the preferred embodiment 3 of the present invention. FIG. 7A shows a state of radio wave propagated when access points are installed outside the galley 200. In FIG. 7A, area 202 is an area where communication can be reliably established. In the case of using vertically polarized wave, the radio wave is efficiently propagated, and it is possible to obtain stable communication even when access point AP01 is disposed far away from opening 201*a* of galley 200. As a result, it becomes possible to reduce the number of access points.

Figure 7B:
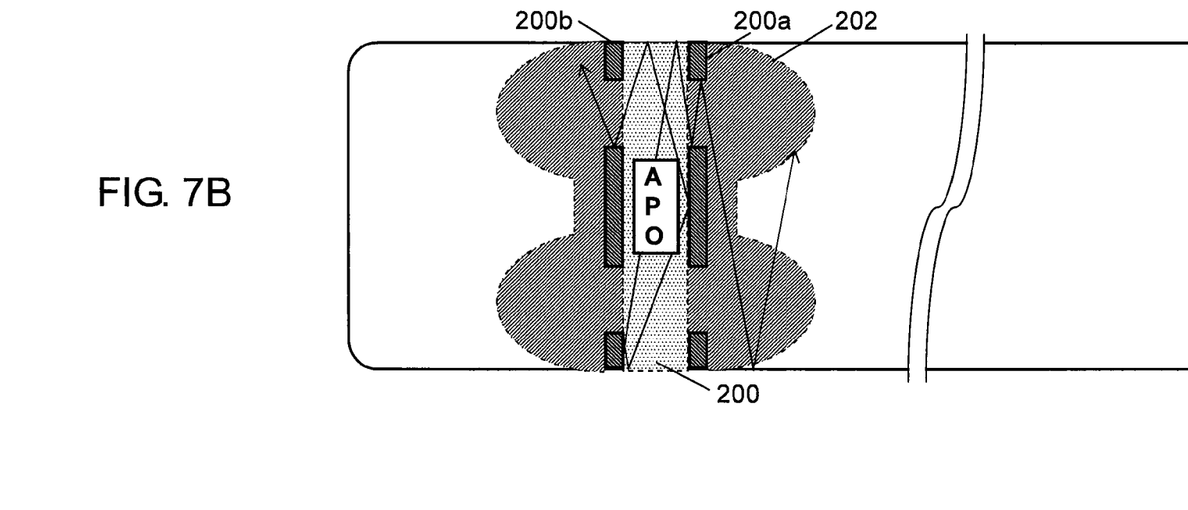
FIG. 7B is an arrangement drawing in which access points for business communication of a wireless communication system in the preferred embodiment 3 of the present invention are arranged in a galley.

FIG. 7B shows a state of radio wave propagated when access points are installed in galley 200. Also in this case, area 202 is an area where communication can be reliably established. When vertically polarized wave is used, the radio wave from access point AP0 is efficiently diffused outside through the opening of galley 200, and therefore, the quality of communication can be maintained. Also, since there is no propagation of direct wave in galley 200, vertically polarized wave may reach even shaded areas, making it possible to establish reliable communication.

As described above, with use of the wireless communication system in the preferred embodiment of the present invention, it is possible to provide and use information communication service by operating a wireless terminal device while freely moving in a space partitioned by wall surfaces in a moving vehicle such as aircraft. Accordingly, it is possible to realize a wireless communication system for moving vehicle which is improved in using convenience. As a system to be installed in an aircraft, when a cabin crew uses a mobile wireless terminal device in a galley or the like, it is effective to establish stable communication. Particularly, when access points cannot be freely installed because the space in the aircraft is restricted or the number of access points installed is limited because of the cost, it is applicable and effective. Also, the structure of a moving vehicle such as aircraft and train is generally circular or rectangular in shape, using composite materials such as metal or carbon as a material for side walls of the body, giving rise to easier reflection the same as for a galley, and therefore, vertically polarized wave is more effective with respect to radio wave propagation in a cabin as well.

In the preferred embodiment described above, a case of business communication established by cabin crews by using mobile wireless terminal devices is described as an example, but the scope of application of the present invention is not limited to such an example. For example, when contents data is distributed from a server to a wireless terminal device fixed in a passenger seat, if a galley exists between the access point and the wireless terminal device, the radio wave is interrupted by the galley, and the radio wave is hard to reach some area.

Even in such a case, for example, installing access point AP1 that is an access point for contents distribution in the vicinity of an opening on the extension line of an opening of galley 200, it is possible to efficiently distribute the contents data also to the wireless terminal device of a passenger at the opposite side of galley 200. In this way, it becomes possible to reduce the number of access points for contents distribution.

Also, in the preferred embodiment described above, two relay access points are used in information service area 100, but as shown in FIG. 5, it is also possible to use access point AP04 and access point AP05 in combination which are installed for another information service area 300 partitioned by galley 200. Due to this method, in information service area 100 and information service area 300, the radio wave emitted from galley 200 is received by using one of the four relay access points, and it is effective to enhance the communication quality.

Also, the use of access point AP01 and access point AP02 for relay to each seat of information service area 100 is determined by comparing the received information with respect to timing and quality of the information received at a server device.

Further, in the preferred embodiment described above, access points for cabin crews are disposed at all the four openings of a galley or the like, but the present invention is not limited to this configuration. It is preferable to decide the number of access points taking into account the radio wave environment in the aircraft or the performance of access points.

INDUSTRIAL APPLICABILITY

The present invention can be used as a wireless communication system for establishing wireless communication in a space electromagnetically shielded as in an aircraft for example.

The invention claimed is:

1. A wireless communication system for establishing wireless communication between a wireless base station installed at an upper part of a communication area in a moving vehicle and a wireless terminal in the communication area, comprising:

a space surrounded by wall surfaces rising vertically in the communication area, wherein the moving vehicle is an aircraft, and the space surrounded by the wall surfaces is a galley comprising a kitchen within the aircraft, wherein the space has an opening opened by specified width in a planar direction, the planar direction being along a wall surface of said wall surfaces, the wireless base station is installed in a region extended from the opening of the space by specified width outwardly of the wall surface, wherein the aircraft comprises:
an aisle extending to the galley and aligned with the opening, and
a seat, and wherein the wireless base station is located above the aisle outside of the galley and receives wireless cabin crew communications from the galley, and the wireless communication system further comprises a second wireless base station, located above the seat, that transmits passenger content to a second wireless terminal located at the seat.

2. A wireless communication system for establishing wireless communication between a wireless base station installed at an upper part of a communication area in a moving vehicle and a wireless terminal in the communication area, comprising:

a space surrounded by wall surfaces rising vertically in the communication area, wherein the moving vehicle is an aircraft, and the space surrounded by the wall surfaces is a galley comprising a kitchen within the aircraft, wherein the space has a first opening opened by specified width in a planar direction, the planar direction being along a wall surface of said wall surfaces, the wireless base station is installed in a region extended vertically in the space, wherein the aircraft comprises:
a first aisle extending through the galley and aligned with the first opening, and
a second aisle extending through the galley and aligned with a second opening into the galley, wherein the wireless base station is located in or above the galley, central of the wall surfaces, and between the first and second aisles extending through the galley, and receives wireless cabin crew communications from the galley.

3. The wireless communication system of claim 1 or claim 2, wherein the wireless terminal is a mobile wireless terminal that moves in the communication area.

4. The wireless communication system of any one of claim 1 or claim 2, wherein the wireless communication is executed by using vertically polarized wave of radio wave.

* * * * *